United States Patent [19]
Wight

[11] Patent Number: 5,523,887
[45] Date of Patent: * Jun. 4, 1996

[54] STABILIZED IMAGING SYSTEM

[75] Inventor: Ralph Wight, Northport, N.Y.

[73] Assignee: Loral Fairchild Corporation, Syosset, N.Y.

[ * ] Notice: The term of this patent shall not extend beyond the expiration date of Pat. No. 5,333,076.

[21] Appl. No.: 273,176

[22] Filed: Jul. 26, 1994

Related U.S. Application Data

[63] Continuation-in-part of Ser. No. 147,358, Jan. 21, 1988, Pat. No. 5,333,076.

[51] Int. Cl.$^6$ ............................ G02B 27/64; G02B 23/02
[52] U.S. Cl. ........................ 359/556; 359/554; 359/555; 359/401
[58] Field of Search ................................ 359/554, 555, 359/556, 557, 401

[56] References Cited

U.S. PATENT DOCUMENTS

| | | |
|---|---|---|
| 3,092,687 | 6/1960 | Cannon . |
| 3,503,663 | 3/1970 | Cierva et al. . |
| 3,638,502 | 2/1972 | Leavitt et al. ............................ 354/70 |
| 3,982,255 | 9/1976 | Orlando ............................ 250/203.1 |
| 4,623,930 | 11/1986 | Oshima et al. ............................ 359/555 |
| 4,643,539 | 2/1987 | Brignall ............................ 359/555 |
| 5,333,076 | 7/1994 | Wight ............................ 359/556 |

Primary Examiner—Paul M. Dzierzynski
Assistant Examiner—Audrey Chang
Attorney, Agent, or Firm—Sterne, Kessler, Goldstein & Fox

[57] ABSTRACT

A stabilized imaging system in which the lens assembly is fixed, and an electro-optic imager element is moveable to compensate for three-dimensional movements of the surrounding structure. Preferably the optical train also includes a movable prism, which can rotate the field of view in one plane. Rotation of the imager compensates for the image rotation caused by rotation of the prism.

15 Claims, 10 Drawing Sheets

STABILIZED IMAGING SYSTEM

This is a Continuation-In-Part of Application Ser. No. 07/147,358, filed Jan. 21, 1988, now issued as U.S. Pat. No. 5,333,076.

BACKGROUND OF THE INVENTION

The present invention relates to imaging systems. The present invention particularly relates to aerial reconnaissance systems and methods.

Various known teachings which are believed to be related to various ones of the innovations disclosed herein will now be discussed. However, it should be noted that not every idea discussed in this section is necessarily prior art. For example, characterizations of particular patents or publications may relate them to inventive concepts in a way which is itself based on knowledge of some of the inventive concepts. Moreover, the following discussion attempts to fairly present various suggested technical alternatives (to the best of the inventor's knowledge), even though the teachings of some of those technical alternatives may not be "prior art" under the patent laws of the United States or of other countries.

In aerial reconnaissance, the cost of each reconnaissance run is relatively large. It is therefore desirable to obtain a large amount of information from each run.

In one class of aerial systems, the motion of the air vehicle provides a scanning motion in one direction. Thus, it has long been recognized that a continuous sequence of linear images of the ground provides a convenient way to assemble a large-area image. In such a system, one of the determinants of image resolution is the lateral resolution within the image track.

Effects of Platform Motion

In a fixedly mounted reconnaissance system, any change in the vehicle's attitude will cause a corresponding movement of the image on the focal plane. This movement may be very large. Thus, reconnaissance under turbulent air conditions presents some inherent difficulty in attaining high resolution output, since the aerodynamically-caused movement of the vehicle may degrade resolution of the image. For example, in a system which is operating at 5000 feet, and which has a lateral resolution of 12,000 pixels across a 45 degree field of view, a roll axis attitude change of only one degree would cause a lateral image shift across several hundred pixels. Thus very small attitude changes have the potential to cause drastic shifts in the image.

It has therefore been recognized in the art that compensation for aircraft attitude changes is highly desirable. One previously suggested way to accomplish this is to use a camera (or electro-optic imager) assembly which is mounted on gimbals, and mechanically driven for stabilization. Another approach, used with film-based photographic systems, has been to actively move the film magazine. See, for example, U.S. Pat. Nos. 3,092,687, 3,503,663, 3,638,502, and 3,982,255, which are hereby incorporated by reference. However, many such approaches have the disadvantage that the moving mass is relatively large. This means that high frequency components of instability cannot be optimally compensated. Moreover, a mechanism which is able to move the whole assembly is likely to be relatively bulky, heavy, and expensive, particularly in view of the environmental constraints on such an assembly.

Turbulence is particularly likely to cause transient instabilities along the roll and pitch axes of an aircraft. Thus, one problem with prior methods is that the available quality of aerial reconnaissance has been dependent on air turbulence conditions. This is particularly a problem in military applications, where information may be needed urgently.

In reconnaissance systems for military applications, it is highly desirable for the air vehicle in which the reconnaissance equipment is mounted to be able to take evasive maneuvers. In many previous aerial reconnaissance systems, an aircraft running a reconnaissance mission must be very restrained in maneuvering. This makes it a better target. If the changes in the air vehicle's attitude cannot be performed without interrupting the reconnaissance run, then the air vehicle's survival and its mission are inherently in conflict, which is not an ideal situation. Thus, it would be highly desirable if aircraft (or other air vehicles) could maneuver with more freedom during reconnaissance runs. This would also be advantageous for non-military aerial surveying applications, since there would be less need for precise control of the aircraft course track during the surveying run.

One conventional type of reconnaissance system forms a line image onto a moving roll of film. Such systems inherently provide a slight degree of resistance to roll instabilities, since to some degree the effect of roll instabilities would show up merely as a waviness of the lines along the track of the airplane. However, such systems do not fully compensate even for roll instabilities, since, depending on the exposure time of the film (determined by the width of the slit and the speed of film transport), there still may be some blurring of detail. Moreover, such systems are vulnerable to pitch axis instabilities. Moreover, even if all of the information is present on the film, image interpretation may still be difficult if the image is distorted.

In addition to roll instabilities, air vehicles will also commonly have pitch instabilities of large magnitude. Pitch instabilities due to turbulence, or changes in pitch attitude due to maneuvering, are particularly likely to occur at a relatively high angular change rate, and therefore have a large potential to degrade imaging performance.

Yaw variations (i.e. rotations of the air vehicle around the geometric axis which would be vertical during normal level flight) can also be caused by turbulence, although the magnitude of these instabilities will typically be much smaller than those about the pitch and roll axes. However, yaw variations are an essential component of maneuvering an aircraft. Therefore, reconnaissance during maneuvering would be impractical without some way to compensate for yaw attitude changes.

An airplane may also have a "crab" component, where the track vector (in the ground frame of reference) is not perfectly aligned with the principal forward axis of the air vehicle. This will commonly occur where an airplane is flying in a cross-wind, and may also be caused by aerodynamic imbalance in a damaged aircraft. This component of motion will appear, at the focal plane, as a fixed offset or slowly varying component of yaw attitude. At moments when the cross-wind (at the plane's location) changes rapidly, there will in fact be a transient yaw component.

Electro-Optic Reconnaissance

In electro-optic systems, an optical train images ground features onto an imager, and the imager measures the image intensity at a number of locations. (Each such location is referred to as a picture element, or "pixel.")

There are significant potential advantages to using electro-optic sensing methods in aerial reconnaissance applications. However, normal area imaging formats are not at all suitable. For example, standard NTSC image format (such as used in television) is less than 600 pixels wide, but this falls far short of the resolution required in many aerial reconnaissance applications. For example, reconnaissance cameras using roll film will often have resolutions of 20,000 equivalent pixels or more in width.

One potential advantage of electro-optic devices in reconnaissance systems is that data can be transmitted to remote locations, without awaiting physical transfer of film. Another potential advantage is that the delays and logistics requirements of emulsion processing can be avoided. Another potential advantage is that the output of an electro-optic imager is inherently better suited to interface to the image-recognition algorithms which may be developed in the future. Another potential advantage is that, as the capability to make images more understandable by preprocessing them advances, the output of electro-optic imagers will improve accordingly.

One well-known type of electro-optic imager is a charge-coupled device, or "CCD." A CCD is a semiconductor device wherein each imaging site is a potential well for minority carriers (normally electrons). Each potential well will collect electrons generated by photon absorption in its vicinity. The CCD output indicates the amount of charge collected in each well, and therefore the photon flux seen at each well.

Often a linear imager will be used, so that what is imaged at each instant is a strip on the ground. The motion of the platform sweeps this coverage along the ground, at the speed of the platform, to produce a large combined multi-strip image. In such systems, the use of an imager which has a large number of pixels will help to achieve high resolution in each strip (and therefore high cross-track resolution in the combined image), subject to the constraints of the optics. For example, it has been suggested that a linear CCD could be used as an electro-optic sensing element in an aerial reconnaissance system. See Rachel and Roberts, "Evaluation of the Electronic Wide Angle Camera System," at page 129 of the proceedings (designated volume 137) of the SPIE conference on *Airborne Reconnaissance III* (1978), which is hereby incorporated by reference. Note that this publication suggests that a linear CCD can be thought of as analogous to a scanning slit used to expose film.

Image Rotation

Published European Patent Application No. 0-127-194 (Application No. 84200649.6, filed May 8, 1984, claiming priority of French Application No. 8307911, filed May 11, 1983) shows an optical system mounted in a fixed nacelle on an aircraft. Rotatable elements permit pointing the field of view in any desired direction within a half sphere. This application recognizes that the rotation of the pointing elements will introduce a rotation into the image. This application further teaches that the apparent image rotation can be removed by use of a Péchan prism (shown as element P in the drawings).

SUMMARY OF THE INVENTION

Various innovative teachings will now be discussed, and some of their respective advantages described. Of course, not all of the discussions in this section define necessary features of the invention (or inventions), for at least the following reasons: 1) various parts of the following discussion will relate to some (but not all) classes of novel embodiments disclosed; 2) various parts of the following discussion will relate to innovative teachings disclosed but not claimed herein; 3) various parts of the following discussion will relate specifically to the "best mode contemplated by the inventor of carrying out his invention" (as expressly required by the patent laws of the United States), and will therefore discuss features which are not necessary parts of the claimed invention; and 4) the following discussion is generally quite heuristic, and therefore focusses on particular points without explicitly distinguishing between the features and advantages of particular subclasses of embodiments and those inherent in the invention generally.

The electro-optic sensing system provided by the present invention has a large capability to compensate for various aircraft movements. This system can compensate not only for instabilities caused by aerodynamic forces or control logic, but also for large magnitude attitude changes caused by maneuvering.

In compensating for aircraft movements, there are at least two constraints to consider: first, the compensation system, considered as a whole (including both electrical and mechanical characteristics) must have a sufficiently large response bandwidth so that rapid changes in attitude can be adequately compensated. (This is particularly important in compensating attitude changes in the pitch and roll axes.) Second, the magnitude of compensation possible should preferably be large. That is, for example, a system which could compensate for a few degrees of roll attitude change might be useful in compensating for attitude changes caused by random turbulence, but would not be able to compensate for normal maneuvering. By contrast, a system (like the presently preferred embodiment) which can fully compensate for a roll attitude of 50° from level flight will permit the aircraft to perform an extensive range of aerodynamic maneuvering without interrupting the reconnaissance mission.

The present invention is particularly advantageous in medium-altitude reconnaissance applications. (An example of such an application would be use in an air vehicle which had an average speed of 500 knots at an altitude of 5000 feet.) In such applications it may be necessary to image only a relatively small field of view (e.g. 20°), which simplifies some of the constraints on the optics. Moreover, the relatively large altitude means that net shifts in the aircraft position will have a relatively small effect on the image dimensions, if the attitude changes can be appropriately compensated. Thus, for example, a rapid change in altitude of 100 feet in an aircraft at 5,000 feet, would, as a first order approximation, cause only about a two percent change in image size. Similarly, a rapid pair of turns, which leaves the aircraft flying on a new track shifted 500 feet from its previous track, would require only about a 6° change (in the roll axis pointing component of the optical train) to continue imaging essentially the same track on the ground. (Any resulting shift in perspective is strictly a second order effect. For example, a lateral shift of ten percent of altitude would cause about one percent apparent elongation of areas at the far edge of the field of view. Moreover, this elongation could be reduced, if necessary, by laterally shifting the imager within the focal plane.)

A further advantage of this system, as compared to systems where the whole camera assembly is pivoted on gimbals, is that the external window 112 can be smaller than would otherwise be required. That is, since the fore-aft field of view of the lens assembly 100 is predetermined, the window 112 need be made no larger (in the fore-aft dimension) than necessary to accommodate this field of view. This in turn provides advantages of cost, weight, and reliability of window 112.

Full multi-axis compensation for attitude changes not only permits the reconnaissance mission to be continued, it also simplifies interpretation of the data. That is, the image data provided by the present invention will essentially correspond to sequential measurements along a single straight track. It is much easier to directly interpret such data, since transformations to preserve geometric relationships are not required.

It should be noted that yaw axis attitude changes, while less important for instability compensation than roll and pitch axis changes, are a necessary component of a complete maneuvering compensation system. That is, a system which can compensate for roll pitch and yaw attitude changes can compensate for any attitude changes (within the range of available compensation). Thus, for example, one advantage of the present invention is that a full series of turn maneuvers can be fully compensated without interrupting reconnaissance.

Thus, a significant teaching of the present invention is an optical assembly which is able to maintain a given pointing angle in inertial space (or to maintain pointing at a given target position). By decoupling the reconnaissance mission form the airframe movements, this teaching provides immense advantages in airborne reconnaissance.

Some of the innovative teachings in the present application could be used in imaging systems other than airborne reconnaissance system, particularly where the available platform may have significant proper motions. However, the primary application contemplated is aerial reconnaissance, and the innovations taught herein are particularly advantageous in that context.

BRIEF DESCRIPTION OF THE DRAWINGS

The present invention will be described with reference to the accompanying drawings, wherein:

FIG. 2, which comprises FIGS. 2A and 2B, is a schematic diagram of the signal processing preferably used on the outputs of the imager 110.

DETAILED DESCRIPTION OF THE PREFERRED EMBODIMENTS

The numerous innovative teachings of the present application will be described with particular reference to the presently preferred embodiment, wherein these teachings are advantageously applied to the particular problems of medium-altitude reconnaissance. However, it should be understood that this embodiment is only one example of the many advantageous uses of the innovative teachings herein.

General System Configuration

Figure 1A:
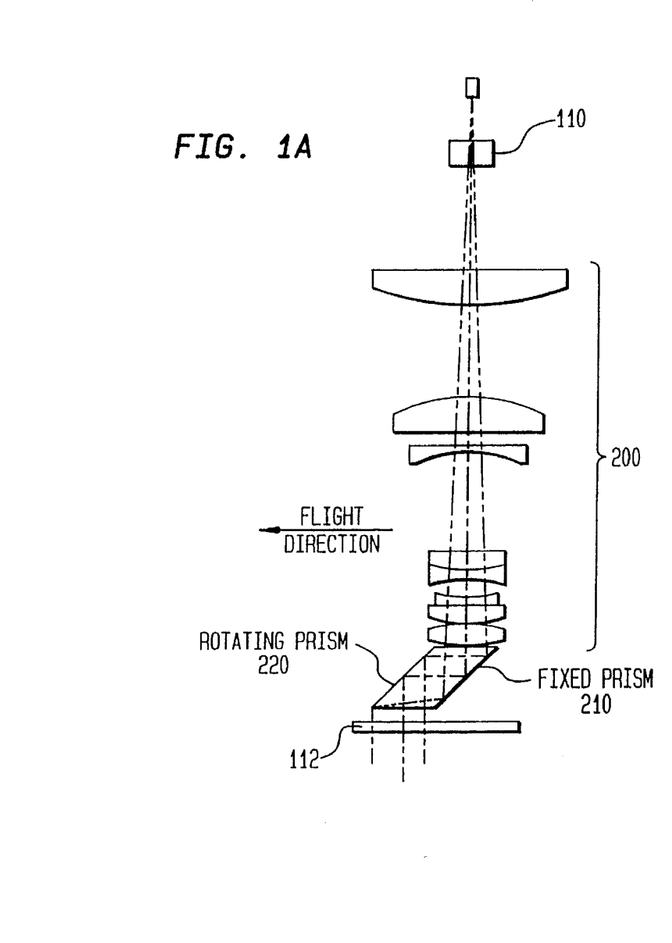
FIG. 1A is a sectional view, from the left (port) side of the aircraft of key portions of the optical train of the presently preferred embodiment.
Figure 1B:
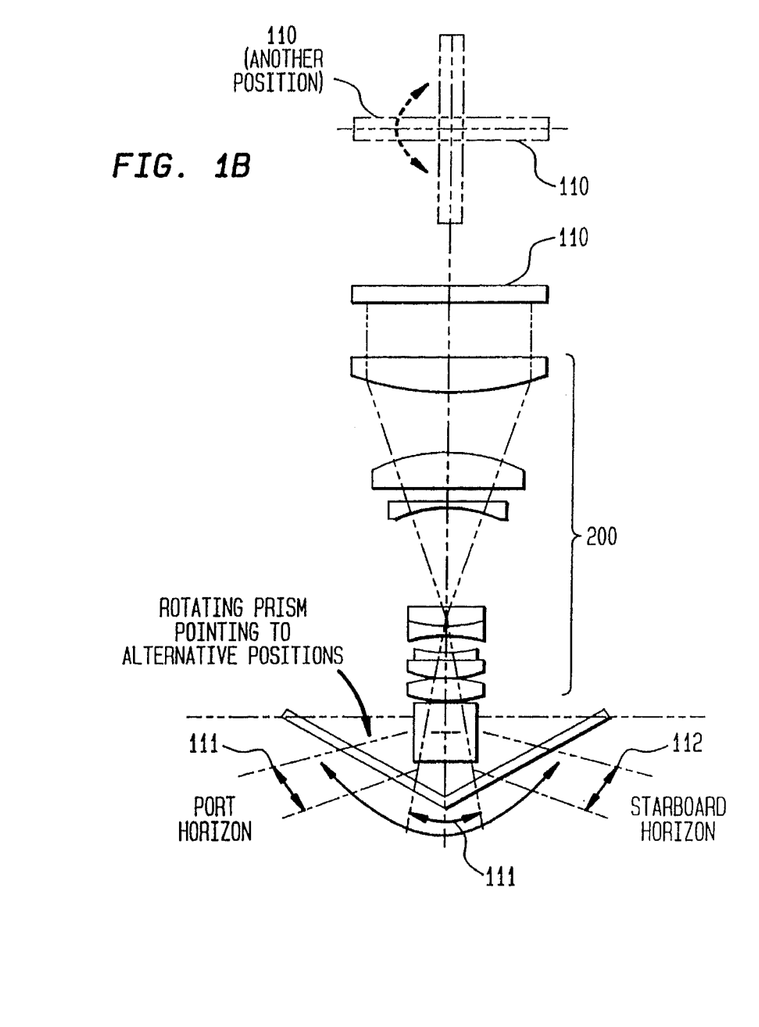
FIG. 1B schematically shows a sectional view of the optical train in the presently preferred embodiment, as seen from the rear of the aircraft. The top portion of FIG. 1B also shows, in elevation, the rotation of the imager 110.

FIG. 1A shows key portions of the presently preferred embodiment. A lens assembly 200 images a track on the ground, as seen through external window 112, onto imager 110. The optical train is coupled through a fixed prism 210 and a rotating prism 220. The rotating prism 220 is mounted so that it can pivot along the roll axis of the aircraft, and, as shown in FIG. 1B, can direct the field of view 111 from a position near the port horizon of the aircraft to a position near the starboard horizon of the aircraft. An alternative approach would be to replace the two prisms 210 and 220 with optical mirrors. The mirrors provide the advantage of thermal stability but reduce the amount of usable light entering the optical train.

FIG. 1A is a sectional view, from the left (port) side of the aircraft, of key portions of the optical train of the presently preferred embodiment.

FIG. 1B schematically shows a sectional view of the optical train in the presently preferred embodiment, as seen from the rear of the aircraft. The top portion of FIG. 1B also shows, in elevation, the rotation of the imager 110.

Figure 3A:
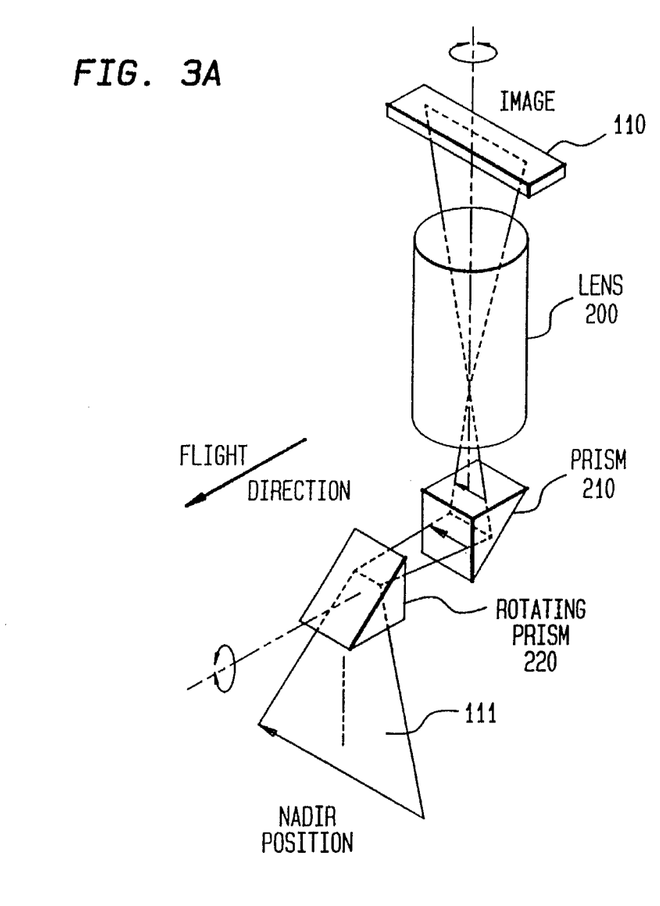
FIGS. 3A and 3B schematically show how the rotation of the imager 110 compensates for the apparent image shift caused by rotation of the rotating prism 220.
Figure 3B:
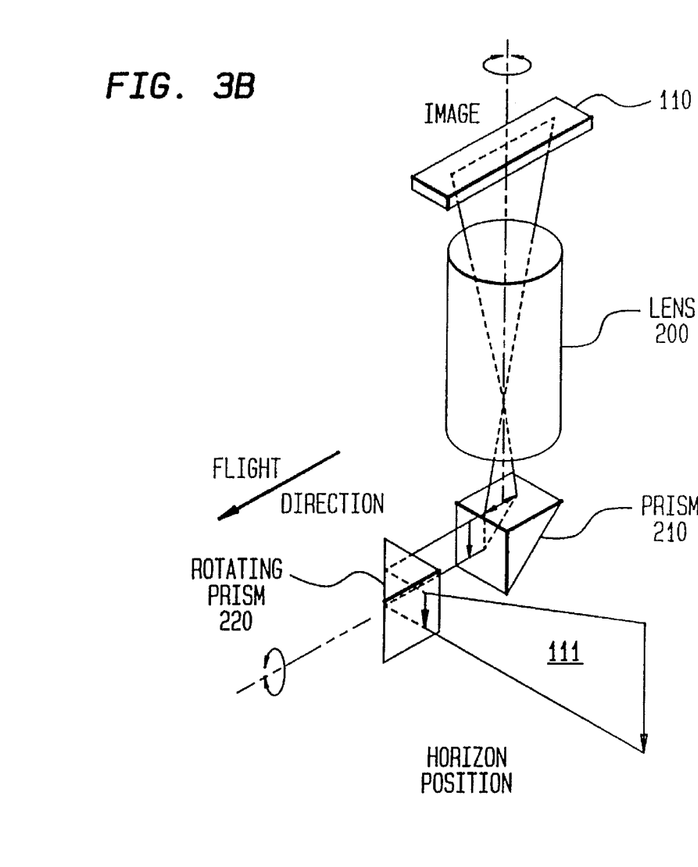

FIGS. 3A and 3B schematically show how the rotation of the imager 110 compensates for the apparent image shift caused by rotation of the rotating prism 220. FIG. 3A shows the nadir position, and FIG. 3B shows the horizon position. As this pair of figures shows, a 90° rotation of the prism 220 is compensated by an equal rotation of the imager 110.

Another way to think of this operation is that the imager 110 is imaged onto a line which continuously sweeps along the ground in the same track. In order to maintain this optical alignment, one of the components of motion of the imager 110 is a rotational component, synchronized with the rotation of a prism 220. Another component of the rotational drive of imager 110 is synchronized to the airframe yaw axis component, as derived from gyro information. A further static component may be added in for crab compensation.

Of course, other means well known to those skilled in the art could be used instead to compensate for apparent image rotation caused by the rotation of prism 220. However, a particular advantage of performing this compensation using rotation of the imager 110 is that the same motion of imager 110 is also used to provide compensation for yaw axis attitude corrections.

One significant class of alternative embodiments permits both of the prisms 210 and 220 to be rotated. Rotation of the "fixed" prism 210 permits the field of view to be moved in the fore-aft direction. Thus, this additional motion can be used for pitch compensation. Rotation of the prism 210, like rotation of prism 220, produces apparent image rotation which must be compensated. Thus, in-plane rotation of the imager is preferably driven by a control signal which includes two components corresponding to the rotations of the two prisms. Systems which include the capability for rotation of prism 210 should include the capability for in-plane rotation of the imager, but may or may not also include the capability -for in-plane translation of the imager. Depending on the optics and window geometry used, rotation of prism 210 may permit a much larger range of pointing angles in the pitch axis than is permitted by in-plane translation of the imager.

Lens Assembly

Figure 7:
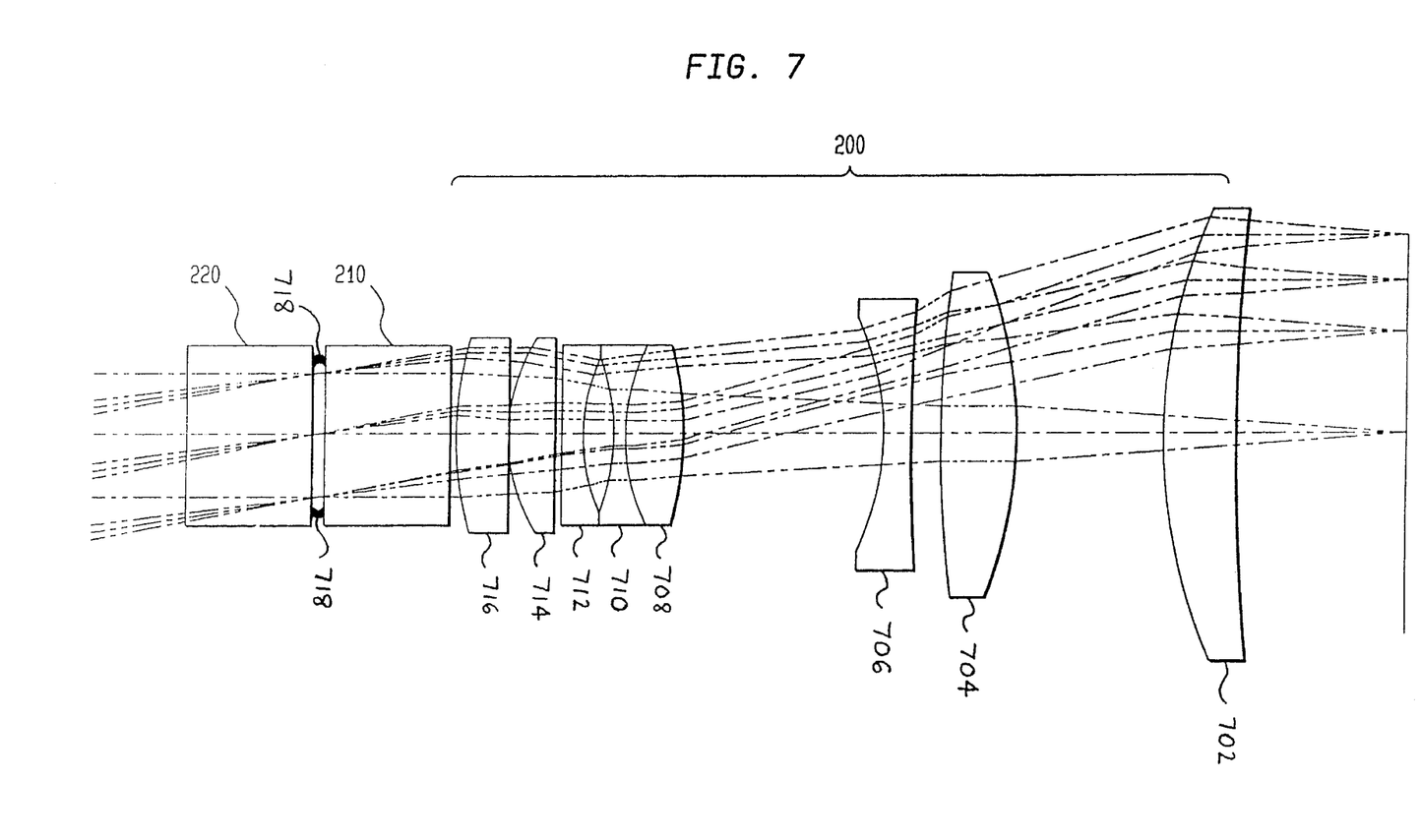
FIG. 7 shows the lens system preferably used.

FIG. 7 shows the presently preferred embodiment of the lens assembly 200. (This drawing is seen along the axis of the optical train, so that the prisms are shown simply as transmissive elements.) The lens assembly 200 is generally conventional. However, it does have one distinctive feature which should be noted: it has an external entrance pupil 18, positioned between the rotatable prism 220 and the stationary prism 210. This means that the apertures of the two prisms can be made relatively small, for a given field of view. This has two advantages. First, the rotating mass of the rotatable prism can be small, so that the net bandwidth (of the of the electromechanical system defined by the roll attitude sensors and the corresponding response of the rotating prism) will be large, which is desirable. Second, the smaller the physical size of the rotating prism, the smaller the external window 112 can be made (for a given lateral field of view), which is also desirable. The characteristics of the lens assembly 200 (with a focal length f/5.6) are summarized as follows:

| | RADIUS OF CURVATURE | | APERTURE DIAMETER | |
|---|---|---|---|---|
| LENS | FRONT | BACK | FRONT | BACK |
| 716 | 4.7357 CX | 38.3939 CC | 2.8139 | 2.8131 |
| 714 | 3.8650 CX | −16.0039 CX | 2.8240 | 2.7542 |
| 712 | −20.1510 CC | 3.0747 CC | 2.7066 | 2.5096 |
| 710 | −4.2702 CC | 3.6674 CC | 2.5099 | 2.6631 |
| 708 | 3.6674 CX | −5.8129 CX | 2.6631 | 2.7260 |
| 706 | −2.4502 CC | 43.3927 CC | 2.9907 | 3.4525 |
| 704 | 42.3123 CX | −5.1987 CX | 4.2983 | 4.4124 |
| 702 | 7.2435 CX | 40.5019 CC | 5.1972 | 5.1564 |
| 700 | | | 4.7325 | 4.7387 |

NOTE:
Positive radius indicates the center of curvature is to the right
Negative radius indicates the center of curvature is to the left
Dimensions are given in inches
Pupil 718 has a entrance diameter of 2.1429 and an exit diameter of 8.1281

In some applications, it may also be advantageous to include filtering to reduce blue and near-UV wavelengths, to minimize the effects of haze. The CCD sensitivity curve of a silicon device will inherently have a slight roll-off in the blue, which is advantageous.

Imager

Preferably the imager 110 is configured as two linear charged coupled devices (CCDs), mechanically abutted. In the presently preferred embodiment, each of the linear CCDs has 6000 pixels, so that the image is 12,000 pixels wide. Linear CCDs are generally well known and widely available. However, the presently preferred embodiment of the imager will now be described in detail, for clarity and because some of the features of this imager are particularly advantageous in the context of the system described.

In the presently preferred embodiment, each of the linear CCDs has 6000 active photosite elements and 20 dark reference elements. Two transfer gates provide parallel transfer: one transfer gate transfers the charge from each of the odd-numbered photosites to a site in a CCD shift register, and the other transfer gate transfers the charge from the even-numbered photosites to another CCD shift register. Each of the two shift registers can be clocked to transfer charge packets along its length to a charge detector and output amplifier. Thus, there are a total of four output lines from the two CCD chips.

The dark reference elements (as is well known in the CCD art) permit the dark current to be subtracted from the raw output, to get a better measure of the optical signal. (A CCD photosite will collect a certain amount of charge at zero illumination, due to traps and other thermally sensitive effects. This amount of charge is referred to as "dark current.") The transfer gates access these dark reference elements analogously to the active photosites.

To facilitate butting the two CCDs together, a trench is etched at the butt end during device processing. The sidewalls of this trench are passivated with channel stop doping and field oxide. This means that a sawing operation can cut through the trench bottom, with reduced risk of destroying the last photosite. This structure also reduces charge leakage into the last photosites. Other known methods are also used to avoid spurious signals: for example, portions of the second metal level are used to screen areas other than active photosites from illumination, and a guard ring preferably surrounds active areas.

Figure 6A:
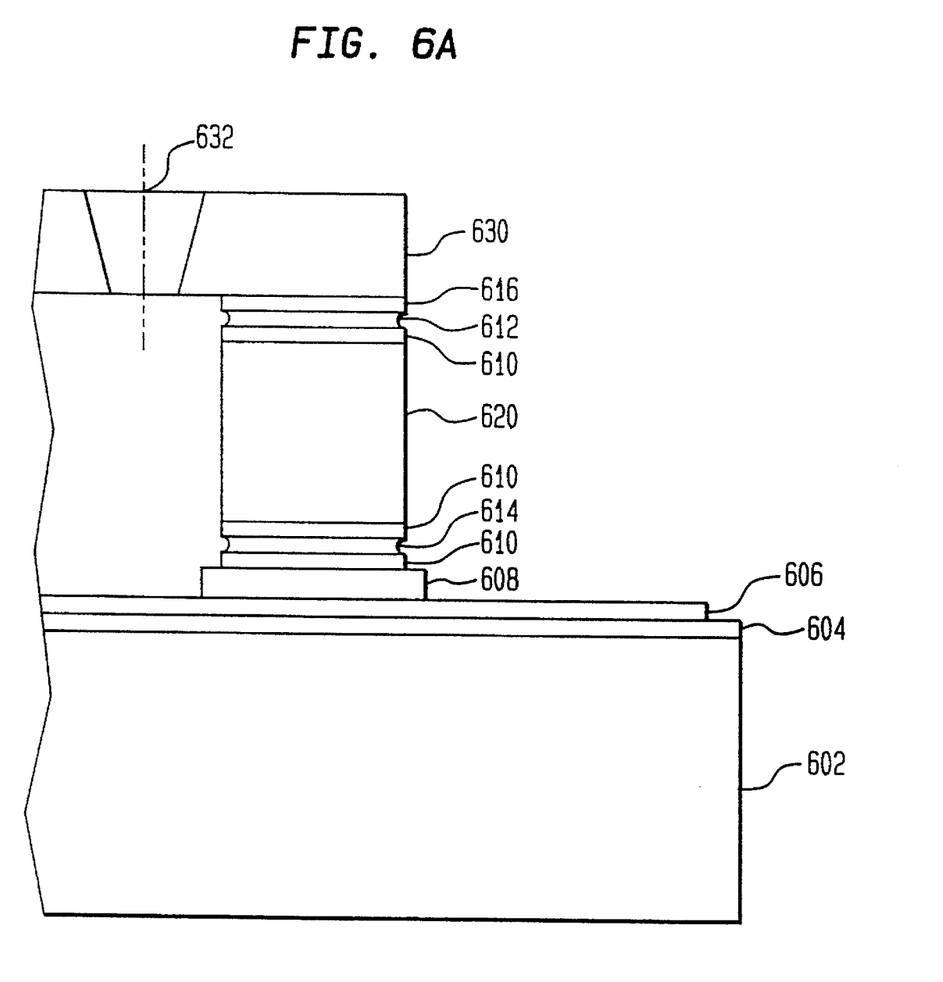
FIGS. 6A through 6C show the presently preferred embodiment of the imager package.

FIG. 6A shows the presently preferred embodiment of the package used for the CCD imager chips. A thick polycrystalline silicon substrate 602 has a thick film insulating glaze 604 and a screenprinted thick-film metallization 606 (preferably gold) overlaid on it. The conductor 606 is patterned to bring leads (for signals, power, ground, etc.) outside of the hermetic seal. Another thick film insulating glaze layer 608 overlies conductor layer 606 in the seal area, to provide a planar sealing surface.

The window 630 (which is preferably sapphire, but may be quartz or other material) is given a thin patterned metal coat 616 on its backside in the seal area. In the presently preferred embodiment, this is a thin layer of Cr/Ni/Au, but other materials may be used instead. This may be deposited, e.g., by evaporation or sputtering.

A silicon frame 620 forms a connection from window 630 to substrate 602. The actual CCD chips are epoxied to substrate 602 inside the ring defined by silicon frame 620. (Preferably this epoxy attachment is performed under a microscope, at a workstation with micrometer manipulation, so that the relative alignment of the CCD chips can be precisely defined.) Stitch bonding is used to connect bond pads on the CCD chips to the traces of metallization 606. A thick film metallization 610 (preferably palladium/silver) is applied to both sides of the frame 620, to permit formation of a solder bond. (The same metallization is preferably applied over glaze 608.) The frame 620 is then soldered (joint 612) to window 630, and this joint is tested for hermeticity. Frame 620 and window 630 can then be soldered (joint 614) to the metal ring on substrate 602, enclosing the CCD chips within a hermetic seal. The package is then purged and backfilled (e.g., with dry helium), and a tip-off hole 632 (which was preferably previously metallized) is sealed.

Figure 6B:
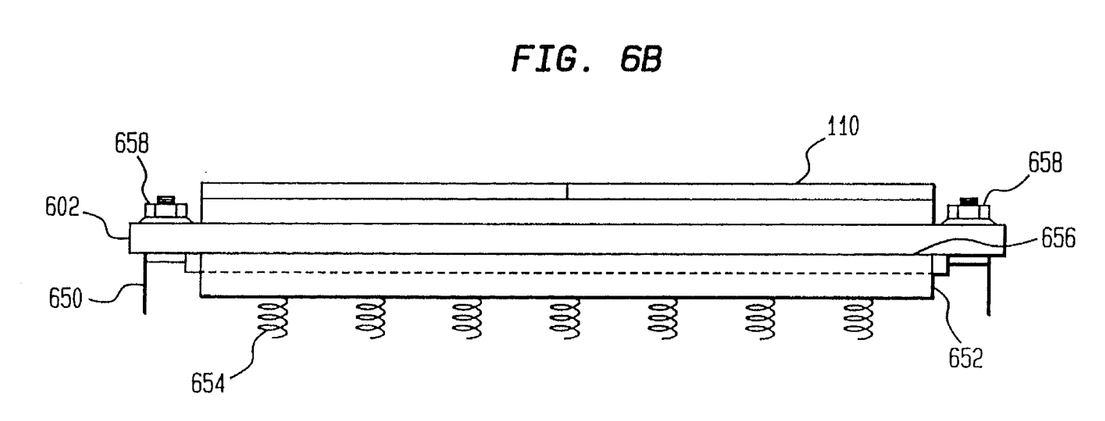

As FIG. 6B shows, the imager thus packaged is preferably attached by stud/nut assemblies 658 to a rigid mount 650 (which includes precision-machined bosses, to assure accurate location of the imager 110 parallel to the focal plane). This rigid mount 650 is connected to the mechanical elements described below, to translate the imager as desired. A thermoelectric cooler 652 is spring-loaded (by springs 654) to make good contact with the substrate 602 (assisted by thermal grease 652).

Figure 6C:
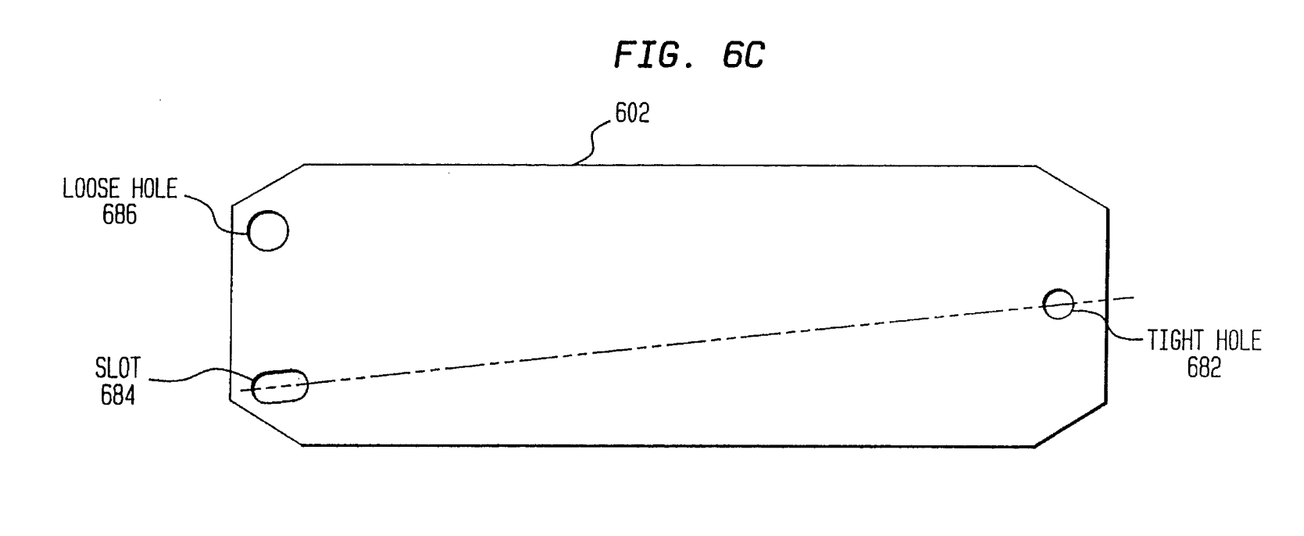

FIG. 6C shows how the connections to stud/nut assemblies 658 allow for thermal expansion. A tight hole 682 (in substrate 602) is a precision fit. A slot 684 permits free movement in one dimension only. Loose hole 686 permits free movement in two dimensions, but does restrict out-of plane movement.

A linear CCD can have great advantages over use of an area CCD in aerial photography. However, various of the inventive concepts set forth herein could also be applied (less preferably) to systems using area imager CCDS. Various of the inventive concepts taught by the present application could also be applied to systems using quasi-linear CCDS, such as time delay and integration (TDI) devices.

It should also be recognized that the "linear" imager used does not strictly have to have a "by-1" configuration. For example, a CCD with two or three parallel lines of sensing sites could also be used, and might even be preferable for some purposes (e.g. color imaging, or to provide immunity to single-pixel defects). For another example, it would also be possible to use optical combinations of more CCDs than the two used in the presently preferred embodiment. It should also be recognized that imagers using other electro-optic technologies (such as photodiodes, charge-imaging matrix technology, electron multipliers, etc.) could also be used. The innovations taught herein can also be extended to systems using wavelengths beyond the visible and near-infrared range used by the presently preferred embodiment.

The CCD imager is preferably temperature-stabilized. In the presently preferred embodiment, the paired CCDs are mounted on a silicon substrate (which provides an excellent thermal match). A sapphire cover is used to provide a hermetically sealed front window. (Sapphire has a good thermal match, but of course other materials could be used instead.) The silicon substrate is preferably mounted on a thermoelectric cooler, which maintains a mean temperature of 10° C.

Mechanical Implementation

Figure 5A:
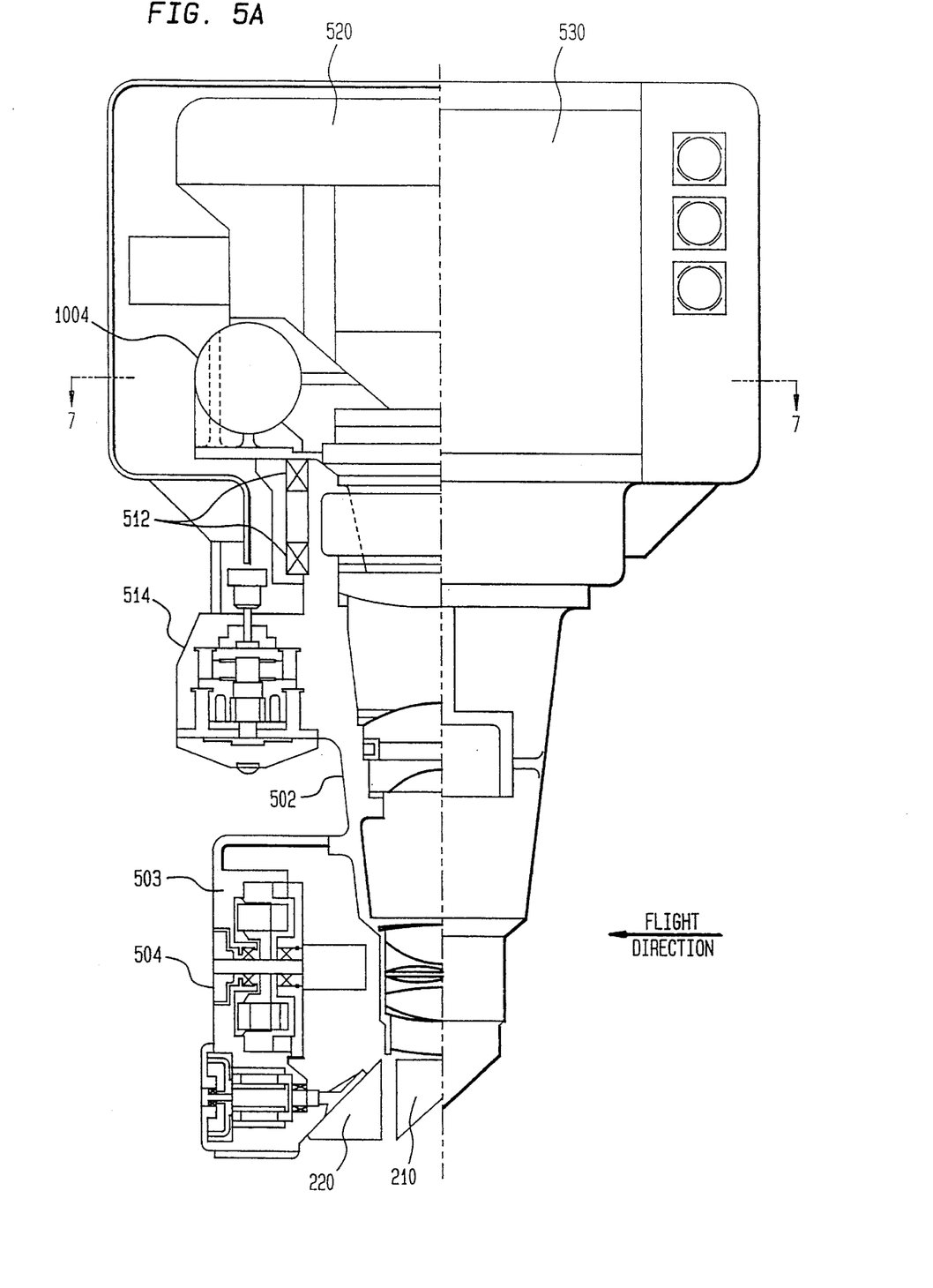
FIGS. 5A and 5B show the relative locations and mechanical connections of key portions of the mechanisms which move the rotating prism and the imager.
Figure 5B:
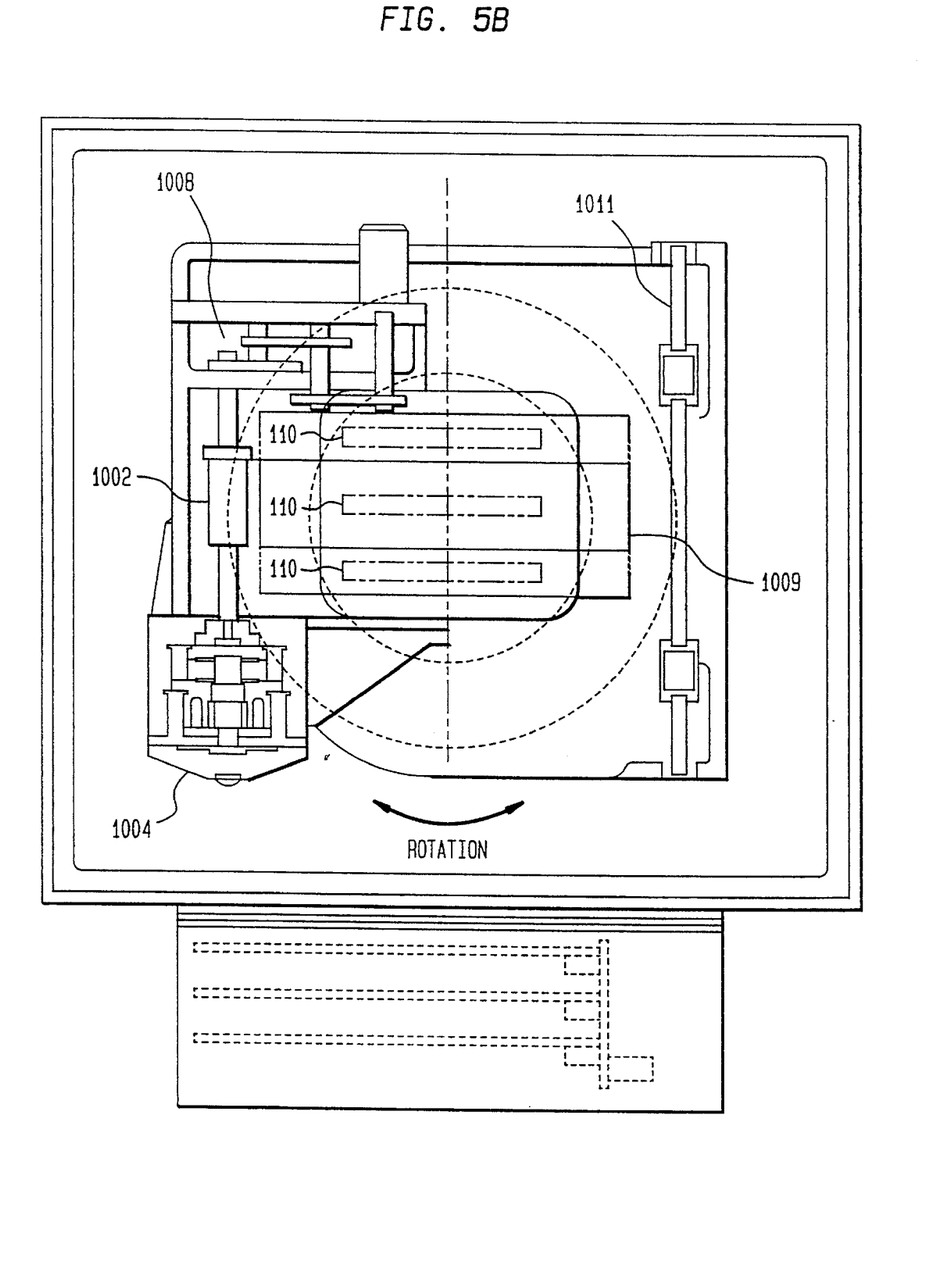

FIGS. 5A and 5B show the relative locations and mechanical connections of key portions of the mechanism which moves the rotating prism, the mechanisms which move the imager, the lens assembly, and the rotating and fixed prisms.

The lens assembly subhousing 106 is preferably housed within an outer housing 502. This prevents any stress on the optical elements, and also provides a convenient subassembly. The outer housing 502 also supports a subhousing 503, which supports the rotating prism 220 and the motor (and tachometer) assembly 504 which drives prism 220. The fixed prism 210 is preferably supported by the lens assembly subhousing 106.

Two large bearings 512 support the focal plane assembly. In the presently preferred embodiment these bearings are about 10 inches across, and the maximum width of the module is about 15 inches. A motor 514 (extending out from the outer housing) drives the rotation of these large bearings, using a simple spur gear and bull gear assembly. (As discussed above, this motion is controlled in accordance with both roll and yaw signals (including crab correction).)

A linear translation mechanism is supported on rotating bearings 512. (The linear translation mechanism is seen most clearly in FIG. 5B, which is a plan view at section A—A of FIG. 5A.)

One axis of linear translation is available in the focal plane. This translation is driven by a motor assembly 1004. The motor assembly 1004 drives a ball screw 1002, which is connected to a support frame 1009. The support frame 1009, translated by motor assembly 1004, is supported at one side by ball screw 1002. On the other side it is shown as supported by a linear bearing assembly 1011. (However, in the latest modification to the presently preferred embodiment, a linear slide is used instead.) In the presently preferred embodiment, the available total motion of the in-plane translation mechanism is about 2.5 inches. (For comparison, the width of the optically active area of the butted CCDs is about 4.75 inches.)

A shaft encoder assembly 1008 is located at the other end of the shaft which extends through ball screw 1002, at the end opposite from the motor assembly 1004. (This provides compact physical dimensions.)

The support frame 1009 supports the range focus assembly 520. The range focus assembly, within the support frame translated by a motor assembly 1004, provides the range focus movement of the imager. In the presently preferred embodiment, the range focus motion is accomplished by a cam and cam follower assembly. The available total motion is about 0.5 inch (although this is more than is strictly necessary).

Figures 2, 2B:
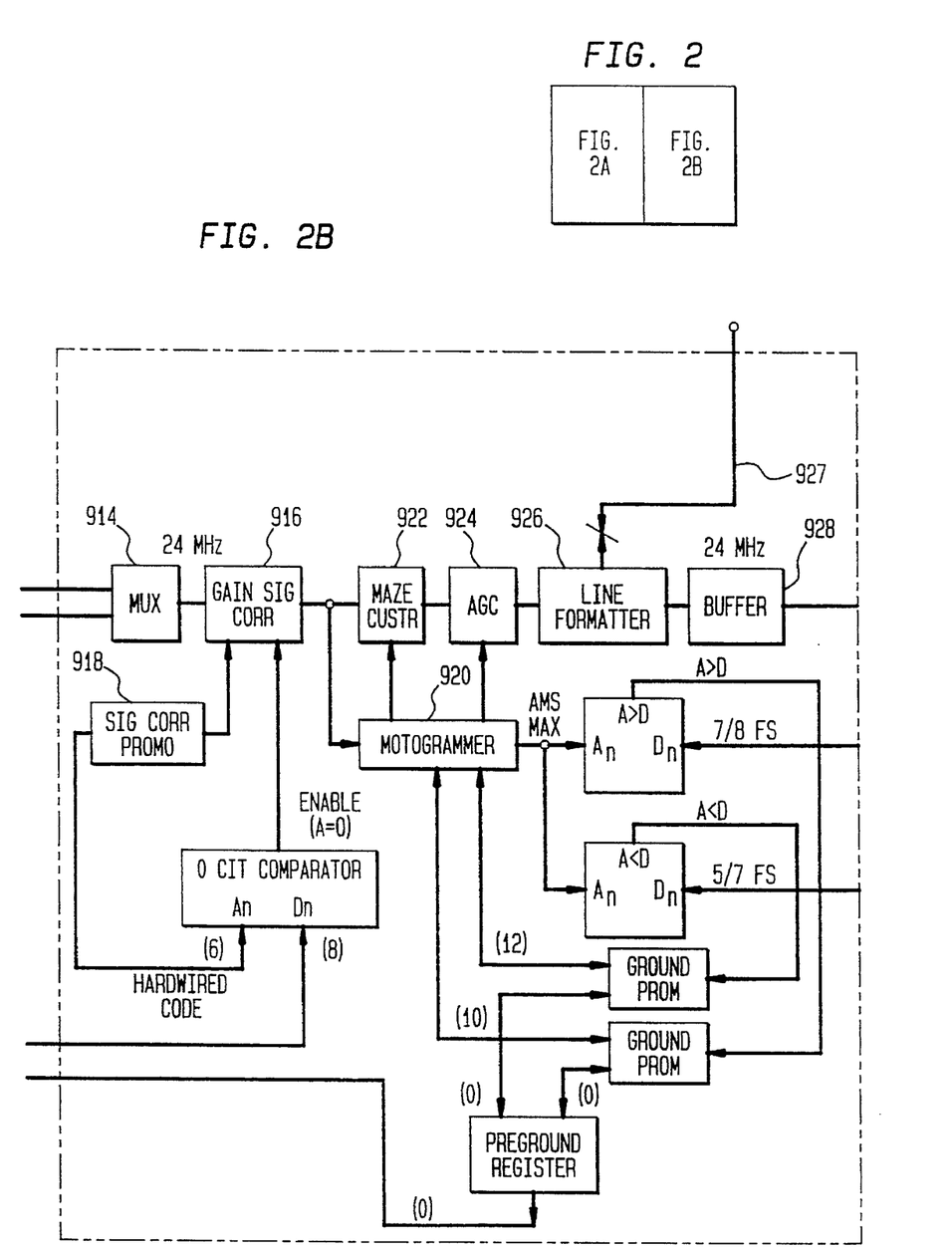
Figure 2A:
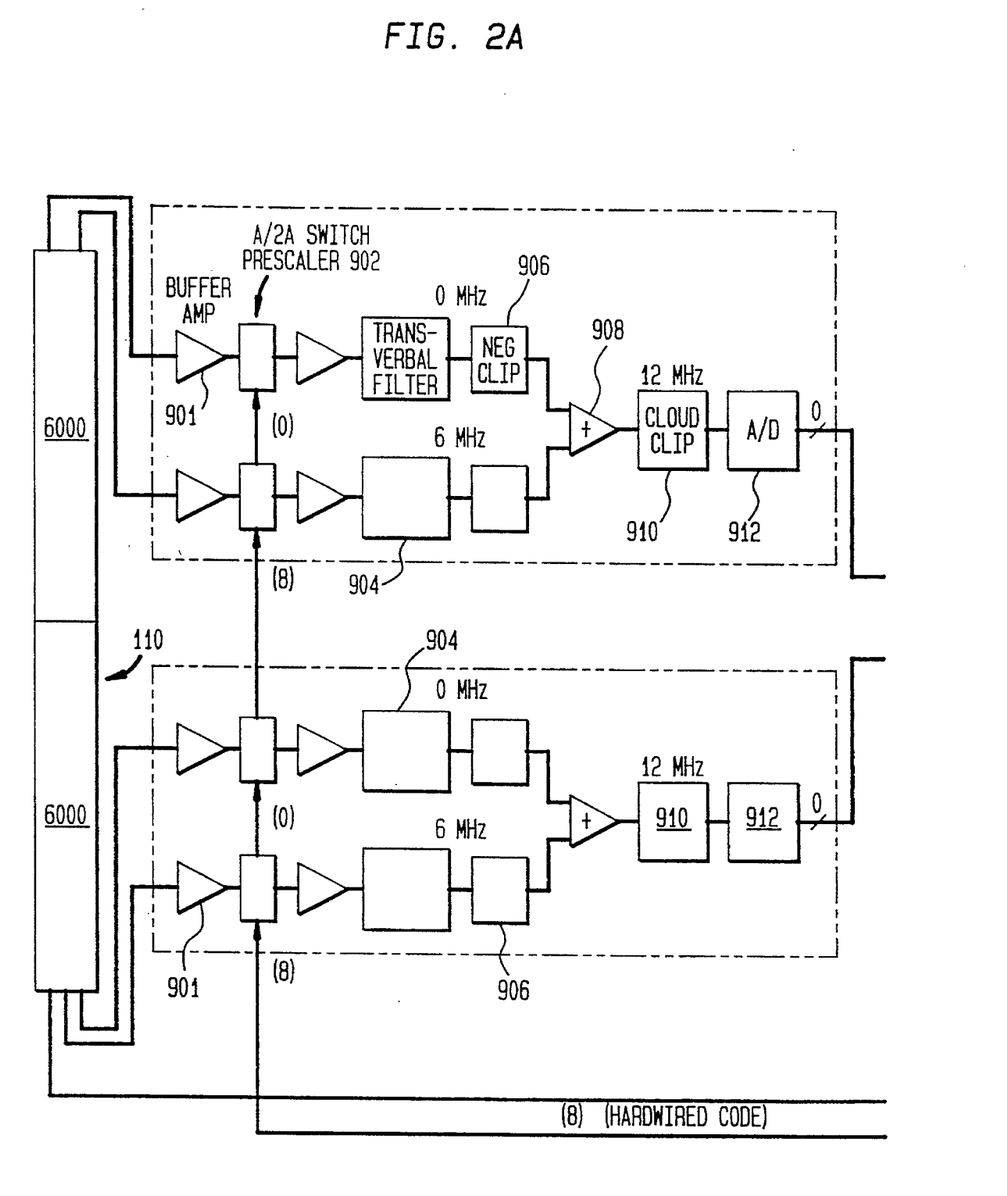
Figure 4:
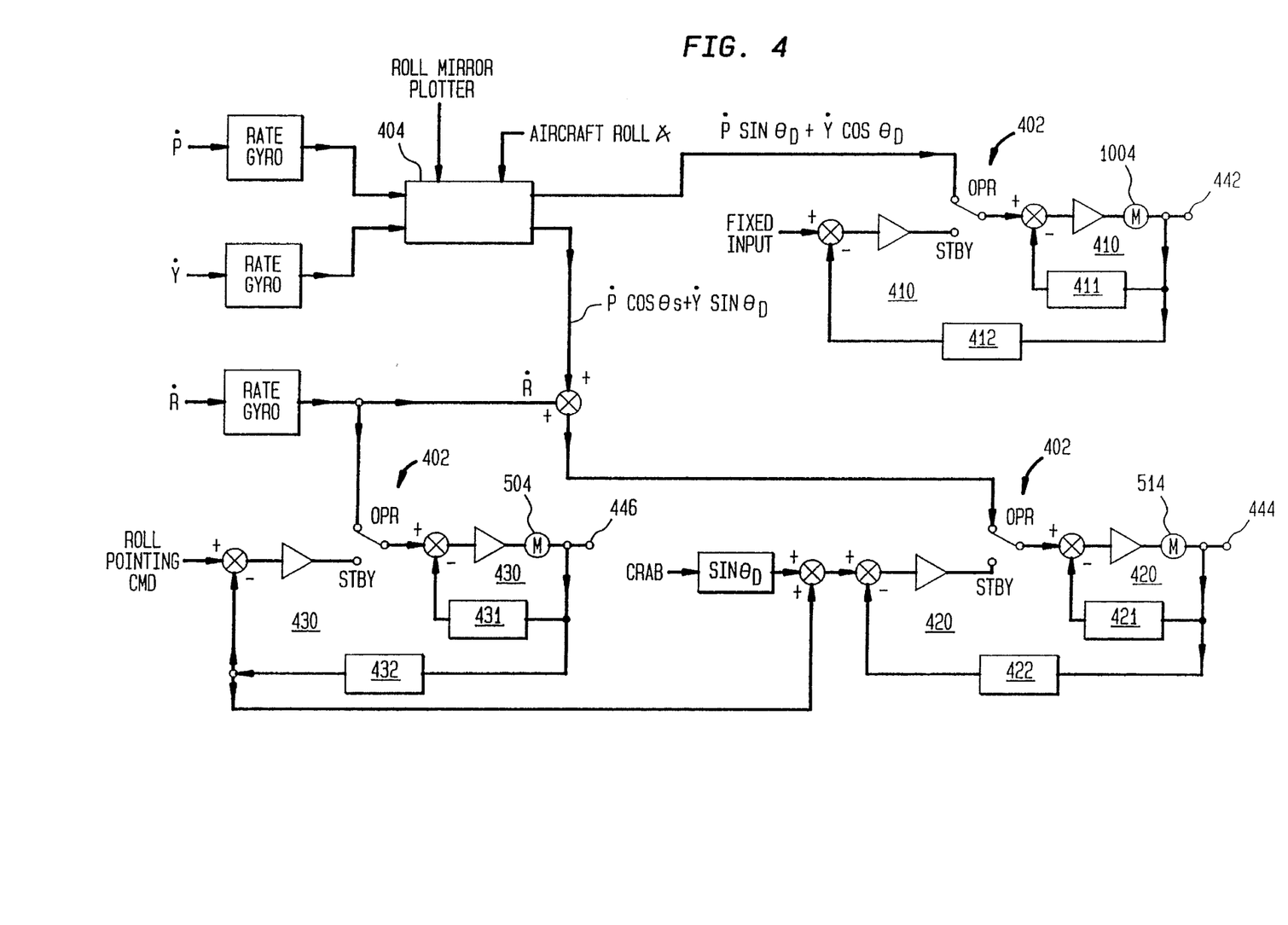
FIG. 4 schematically shows the control logic used to control the movements of the imager.

FIG. 5B also shows the physical location of the electronics 530 which are used, in the presently preferred embodiment, to perform the functions showing in FIGS. 2 and 4.

In the presently preferred embodiment, the range focus mechanism is carried by the mechanism which effects pitch axis movement (in-plane translation), and that mechanism in turn is carried by the mechanism which effects yaw axis movement (rotation). Alternative sequences of "nesting" of the available movements could be used. However, one significant teaching of the present application is that the mechanism which effects rotation should preferably carry (directly or indirectly) the mechanism which effects in-plane translation, rather than vice versa. (In the presently preferred embodiment, the range focus mechanism is carried by the translation motion, but alternatively the range focus mechanism could have been constructed to carry the translation motion mechanism, or the translation and rotation mechanisms.)

Of course, the fact that multi-axis motion compensation is performed by motion of the imager in the focal plane does not mean that additional movement of the lens system, or even of the whole assembly, could not also be used if desired. For example, it would obviously be possible to mount the whole assembly retractably, so that it could selectably be moved back to a more protected position inside the air vehicle, when reconnaissance was not possible. Such an embodiment, where the lens assembly is not moved during operation for motion compensation, is considered to fall within references to a "substantially fixed" lens assembly, as used in the specification and claims of this application.

A further extension of the innovative ideas presented herein is that a system, including multiple axis motion compensation by motion of the imager in the focal plane, could be combined with one or more available movements in the lens assembly or in other parts of the optical plane. That is, in the presently preferred embodiment, the imager has three available components of motion: vertical translation, rotation, and horizontal (in-plane) translation. It would be possible to embody some of these movements equivalently in other parts of the optical system. For example, the range/focus adjustment could optionally (and less preferably) be implemented as a motion of the lens assembly, or of some but not all elements in the lens assembly. (This implementation is definitely less preferred, and would of course be subject to constraints on the entrance pupil at the rotating prism, so that focusing motions would not degrade field of view, or cause darkening towards the edge of the field.)

In another alternative embodiment, it would also be possible (although less preferable) to use moving prisms or mirrors near a pupil of an optical train to compensate for an additional component of motion besides roll axis attitude. For example, as discussed above, two rotating prisms could be used.

Similarly, it should be noted that it is not strictly necessary for the axis of rotation of the rotatable element to be parallel to the roll axis of the air vehicle. (If these axes are not parallel, simple trigonometric transformations can correct the movements of the focal plane to allow for the pitch and yaw axis components of the motion of the rotatable element.) Again, this implementation would be less preferable, but such implementations can make use of some of the innovative ideas presented.

Control

In the presently preferred embodiment, the control system (which controls the movements of the imager) is implemented as an analog system.

The crab input is provided as an external input, and can come, e.g., from the navigation equipment.

If a pitch correction is made while the imager has been rotated (i.e. while the imager is not parallel to the pitch axis), then a trigonometric correction factor (e.g. the cosecant of the angle by which the imager position is away from the pitch axis) is preferably multiplied into the imager shift amount. Similarly, if a rotation must be performed (for yaw correction or for prism rotation compensation) while the imager is off center (e.g. due to pitch correction), it may be desirable to perform a pixel shift operation to maintain accurate reproduction of straight lines in-track. At low magnitudes, some of these errors can simply be tolerated.

The control system has two modes: a position-determining mode and a rate-sensing mode. In FIG. 4, these modes are shown as standby (STBY) and operate (OPR) modes of three switches 402. The imager is translated to a desired position (in the first mode), and then the system is switched over into the stabilization mode. If the imager's position becomes "out of bounds", it is translated back to a central position, the position values are reset, if needed, and active stabilization is resumed. Ideally the resets will not come very often (e.g., every fifteen minutes or so).

Roll, pitch, and yaw rate inputs, from rate gyros, are shown as input values R, P, and Y.

The roll mirror or prism position and aircraft roll angle are applied as inputs to a computation 404 (preferably implemented in a microprocessor), which calculates the instantaneous depression angle θD. This angle is the angle by which the center of the field of view is below the horizon. This angle is used to define the trigonometric transformations which relate motions of the imager to motions of the field of view. The pitch rate input P is transformed to Psin θD+Ycos θD. The yaw rate input Y is transformed to Ysin θD+Pcos θD.

Three electromechanical control loops are used to govern the movements of the field of view. Loop 410 provides an output 442 to control motor 1004 (shown in FIG. 5B) to govern the in-plane translation of the imager 110. Loop 420 provides an output 444 to control motor 514 (shown in FIG. 5A) to govern the rotation of the imager 110. Loop 430 provides an output 446 to control motor 504 (shown in FIG. 5A) to govern the pointing of the rotatable prism 220.

Each of the loops 410, 420, and 430 preferably has two modes, selected by a switch 402. In the "STBY" mode position transducers 412, 422, and 432 are used in the loops 410, 420, and 430 (respectively). In the "OPR" mode velocity transducers 411, 421, and 431 are used to provide the feedback sources in the loops 410, 420, and 430 (respectively). The amplification and feedback arrangements of these control loops are conventional.

Note that the transformed yaw rate input (Ysin θD+Pcos θD) is combined with the roll rate input R to define the input to loop 420, which governs focal plane rotation.

Positioning commands can be applied to the loops in their "STBY" modes. For example, a roll pointing command can be applied to loop 430, in the "STBY" modes, to change the mirror pointing to select a field-of-view. (For example, a pilot may wish to image a particular area which is laterally displaced from the track beneath the airplane.) Similarly, quasi-static yaw axis inputs (to correct for crab angle, i.e. drift angle due to crosswind, with an appropriate trigonometric correction, i.e. multiplication by sin θD) can be applied to loop 420 in its STBY mode. (Note that the three loops shown need not switch modes together.)

The range focus movement is preferably not included in the control system shown. Real-time control of range focus is not normally critical, and may be performed directly by the pilot.

Signal Processing

The imager output is preferably processed in a number of ways. The raw output from the CCD wells will not only contain electrical variations which correspond to the detailed appearance of the scene, but will also include variations due to several other sources. These other sources include overall changes in illumination; changes in average brightness level of the objects in the scene; haze or clouds between the platform and the scene; and charge variations due to electrical noise in the CCD.

FIG. 2 shows generally the routing preferably used. The two CCD chips in imager 110 each have separate outputs for odd and even pixels, so that four parallel channels are used at first. For example, four separate buffer amplifiers 901 and prescalers 902 are shown.

Prescaling

In the presently preferred embodiment, 9-bit quantization is used with prescaling. Prescalers 902 are preferably configured as conventional R/2R ladders, controlled by the signal fed back from later stages.

However, it is contemplated that 10 or 12 bit quantization, with fixed gain, may ultimately be preferred. Output signals from the CCD preferably used will correspond to the range from about 600,000 electrons per saturated well signal, down to about 150 electrons per well residual noise signal. Ten bits of resolution, at a fixed scale, can provide substantially adequate measurement over this range.

Analog Filtering

Before the CCD output is digitized, it is filtered in the analog domain to remove low-frequency noise. This filtering operation is done with a transversal filter 904 which embodies essentially the same transfer function as a correlated double sampler. A following negative clipping stage 906 keeps the signal in bounds.

The four 6 MHz data streams are then multiplexed down to two 12 MHz streams. (The signal format used is such that this combining step can be performed by an analog adder 908.)

Note that the filter 904 performs a function which is different from the analog preliminary stages normally used in any digital system (e.g. offset correction, preamplification, prescaling, and/or antialiasing filter). This transversal filter removes the low- frequency noise components, including kTC and 1/f noise components.

Conventionally, in an analog front end system, such filtering will be accomplished by correlated double sampling. In fact, the transversal filter function preferably used has the same transfer function as a correlated double sampler.

However, one important advantage of the transversal filter is that it is impossible to do matched filtering after correlated double sampling. A possible deterrent to using the transversal filter is that correlated double sampling also strips the pixel clock feedthrough, which the analog transversal filter does not. However, stripping the pixel clock feedthrough is not necessary if the video signal is to be immediately digitized, as it is in the presently preferred application.

Image Brightness Compensation

A/D converters 912 provide 9-bit values for each of the two signal streams, and multiplexer 914 combines the data into a single 9-bit data flow at 24 MHz.

The CCD outputs will be affected by pixel nonuniformities ("pixel signatures") and by position-dependent brightness variation. Pixel signatures result from the nonuniform areas and capacities of the individual collection sites. Position-dependent brightness variation results from the brightness fall-off of the lens: as the imager is moved away from the center of the focal plane, the brightness of the image will be reduced.

In the presently preferred embodiment, image brightness compensation is accomplished (in gain correction stage 916) by multiplying the digitized value of each pixel by a scaling factor. The scaling factors are stored in a PROM 918, as one value for each pixel of the imager. These scaling factors compensate both for the different sensitivities of the various pixels, and also for position-dependent variation in image brightness. (As discussed above, the lens has some brightness fall-off near the edge of its field.)

Gain Control

For optimal recognition, it is desirable to adjust the scaling and offset of the output so that the detail information is clearly recognizable. This is conventionally accomplished by an automatic gain control (AGC) circuit of some sort. A significant difficulty in the prior art has been to perform detail enhancement without introducing artifacts into the image.

The presently preferred embodiment uses a two-dimensional "histogrammer" approach to emphasize the detail information in the scene. Long-term average minimum and maximum values are separately tracked (by histogrammer 920), based on preceding pixels in-track and on all pixels in the cross-track direction. Stages 922 and 924 then scale the pixel values to these two separately-tracked values. Haze subtract stage 922 removes the average minimum, and "AGC" stage 924 scales the pixel values with respect to the average maximum. (Note that these are controlled by inputs from the histogrammer stage 920.)

In addition to the filtering introduced by the histogrammer approach, manual switching (in the analog domain) is used (in the presently preferred embodiment) to remove "cloud spikes" (i.e. spurious horizontal lines caused by atmospheric variations between the platform and the object being imaged). In the presently preferred embodiment, a pilot or operator would directly input a value indicating his estimate of the cloud brightness level seen by the imager, and this value then defines the cloud clipping level. However, alternatively, an additional automatic control loop could be used instead. Control subsystems which will provide automatic compensation for these factors are generally familiar to those skilled in the art. This operation is shown as box 910 in FIG. 2.

Adaptive Time Constant

In the presently preferred embodiment, the time constants for both the minimum (i.e., haze-subtract) and maximum (i.e., AGC) level tracking are reduced by an order of magnitude when a step change in scene reflectivity is detected. An overflow/underflow event counter is used to monitor the number of overflow or underflow events seen by the comparators which come after the AGC range scaler networks. Under reasonably normal scaling conditions, only a moderate level of overflow and/or underflow events will be seen. However, a step change in scene reflectivity will cause a sudden large increase in the number of overflow or underflow events. When the counter detects that the rate of such events has increased above a certain level, it will trigger a change in the time constants associated with formation of the minimum and maximum levels. This has the advantage that frame blackout or frame whiteout resulting from a sharp change in the image is avoided.

In the presently preferred embodiment, the time constant change is accomplished by replicating data values being loaded into a register. That is, to reduce the time constant by a factor of ten, each line's minimum and maximum values are loaded ten times into the averaging operation, rather than only once.

Values for missing pixels (at the butt between the two CCD chips) are generated by averaging the values from the adjacent "live" pixels. Alternatively, missing pixels at the butt of the two CCDs are electrically cut out so the resulting image is uniform and effectively seamless.

"Image Rectification"

"Image rectification" is the process of removing the component of distortion which is caused by unequal in-track and cross-track ground sample distances. The purpose of image rectification is to ensure that each pixel corresponds to an area on the ground which has approximately equal dimensions in the in-track and cross-track directions.

Image rectification is accomplished (in logic not shown in FIG. 2) by generation of a video line rate governed by the following relationship:

$$R (F*V*\sin \theta)/(N*P*H),$$

where R the video line rate

F=sensor focal length

P=pitch of CCD pixel

N=implied pixel grouping integer

V=vehicle ground speed

H=vehicle altitude

θ=the depression angle. (The sinθ term compensates for projection onto a focal plane which is not normal to the ground.)

The implied pixel grouping integer N is changed as needed to avoid infringing the system data rate and/or maximum sensor line rate limits.

Bandwidth Limiting

The implied pixel grouping integer N is determined by the system data rate and/or maximum sensor line rate. In the presently preferred embodiment, the maximum sensor line rate is 2000 lines per second. As long as neither of these factors is limiting, the grouping integer N is left equal to I (i.e. the line rate is not reduced). However, when one of these limits is reached (for example, when V/H increases during flight), N is increased to a higher integer. This means that pixel grouping takes place, so that the line rate is halved. Preferably the number of pixels per line is also halved. (This means that the net data rate is being reduced by $N^2$.)

Alternatively, the parameters for line and pixel grouping may be decoupled. This would mean that retranslation of the output still would be relatively simple (since image pixels would be combined into rectangular blocks), but less drastic steps in data rates would be available. The pixel grouping integer N is set as an input to an I/O multiplexer, which accomplishes pixel grouping.

The rules defining the pixel grouping imager have hysteresis built in. That is, the break points used to define pixel grouping are different under increasing V/H conditions and decreasing V/H conditions. This helps to avoid line rate jitter.

Data Output

In the presently preferred embodiment, the reconnaissance system is designed to be borne by an airplane, and the image data output is saved on a conventional multitrack digital magnetic tape recorder. However, in alternative embodiments an RF downlink (real-time or buffered) could be used instead. This might be particularly advantageous where different platforms (such as drones) are used for the reconnaissance mission.

As will be recognized by those skilled in the art, the innovative concepts described herein can be modified and varied over a tremendous range of applications, and accordingly their scope is not limited except by the claims.

What is claimed is:

1. A reconnaissance system, for mounting in an air vehicle, comprising:
   an optical train, positioned to define a fixed focal plane and comprising at
   least one reflector rotatable to change the external solid angle imaged onto
   said focal plane;
      sensors connected to sense roll and pitch rates of said air vehicle;
      a linear electro-optic imager, movable within said focal plane defined by a lens; and control means for moving said imager within said focal plane in response to outputs of said sensors, to compensate for motions of the air vehicle in a plurality rotational axes, and also to compensate for image orientation changes due to rotation of said rotatable reflector.

2. The system of claim 1, wherein said rotatable reflector comprises a rotatable prism.

3. The system of claim 1, wherein said sensors include a yaw rate sensor.

4. The system of claim 3, wherein said control means is connected to move said imager within said focal plane to facilitate compensation for motions of the air vehicle around all three axes of altitude.

5. The system of claim 1, wherein said optical train includes a second rotatable reflector and said one and second rotatable reflectors are optical mirrors.

6. The system of claim 1, wherein said one rotatable reflector is mounted to rotate about an axis which is substantially parallel to the roll axis of the vehicle.

7. The system of claim 1, wherein motions of said rotatable reflector and of said imager within said focal plane provide compensation for motions of the air vehicle about both roll and pitch axes thereof.

8. The system of claim 1, further comprising a external entrance pupil positioned between said fixed focal plane and said rotatable reflector.

9. The system of claim 1, wherein said rotatable reflector can steer the central point of said external solid angle over an arc of more than 180°.

10. The system of claim 1, wherein said control means is also connected to move said imager normal to said focal plane to achieve a desired range focus.

11. A medium-altitude reconnaissance system, comprising:
   a lens assembly mountable to an air vehicle at a substantially fixed pointing angle;
   a linear imager movable with three degrees of freedom, including rotation and two directions of translation, and aligned with said lens assembly in an optical train which images said imager onto an external strip;
   a movable reflector, aligned with said lens assembly to steer the field of view thereof; and
   control electronics, connected to control movements of said imager at least partially in compensation for movements of the air vehicle to which said lens assembly is mounted,
   wherein said lens assembly is not movable to compensate for movements of the air vehicle.

12. The system of claim 11, wherein said movable reflector comprises rotatable prism.

13. The system of claim 11, wherein said movable reflector comprises a rotatable prism, and wherein rotation of said rotatable prism and movements of said imager are controlled to compensate for roll and pitch rates of said air vehicle.

14. The system of claim 11, further comprising an external entrance pupil positioned between said lens assembly and said movable reflector.

15. A method for performing aerial reconnaissance, comprising the steps of:
   flying an air vehicle along a track which is within view of a desired area to be imaged, wherein said air vehicle includes
   a lens system mounted substantially fixedly;
   a linear imager mounted in the focal plane of said lens system, wherein said imager is controllably movable in multiple directions of translation substantially within the focal plane of said lens assembly,
   a rotatable optical element which, with said lens system and said imager, forms an optical train which images external objects onto said imager, said rotatable optical element being positioned to steer the field of view of said optical train;
   imaging the desired area, while maneuvering the air vehicle freely; and moving said imager during said imaging step, to compensate at least partially for motions of the air vehicle.

* * * * *